United States Patent [19]

Okinaka

[11] 4,377,450
[45] Mar. 22, 1983

[54] PALLADIUM ELECTROPLATING PROCEDURE

[75] Inventor: Yutaka Okinaka, Madison, N.J.

[73] Assignee: Bell Telephone Laboratories, Incorporated, Murray Hill, N.J.

[21] Appl. No.: 368,568

[22] Filed: Apr. 15, 1982

[51] Int. Cl.$^3$ .................. C25D 3/50; C25D 3/52
[52] U.S. Cl. ........................... 204/46 R; 423/592; 204/47
[58] Field of Search ............. 204/46 R; 423/592; 204/47

[56] References Cited

U.S. PATENT DOCUMENTS

| | | | |
|---|---|---|---|
| 4,153,523 | 5/1978 | Koontz et al. | 204/129 |
| 4,230,538 | 10/1980 | Turner | 204/15 |
| 4,310,392 | 1/1982 | Kohl | 204/46 R X |

FOREIGN PATENT DOCUMENTS 2939920  4/1981  Fed. Rep. of Germany .... 204/46 R

OTHER PUBLICATIONS

E. M. Wise entitled Palladium; Recover, Properties, and Uses, Academic Press, New York, 1968, Chapter 6.

*Primary Examiner*—Charles F. Warren
*Assistant Examiner*—Gerard P. Rooney
*Attorney, Agent, or Firm*—Walter G. Nilsen

[57] ABSTRACT

A palladium electroplating procedure is described in which the bath is replenished by palladium hydroxide made in a special way. The palladium hydroxide is made by oxidation of palladium diammine dichloride in alkaline aqueous solution using hypochlorite ion as the oxidizing agent. Palladium hydroxide is ideal as a replenishing agent for palladium electroplating baths because it neutralizes hydrogen ions produced in the electroplating process and does not yield anions that accumulate in the bath.

18 Claims, 1 Drawing Figure

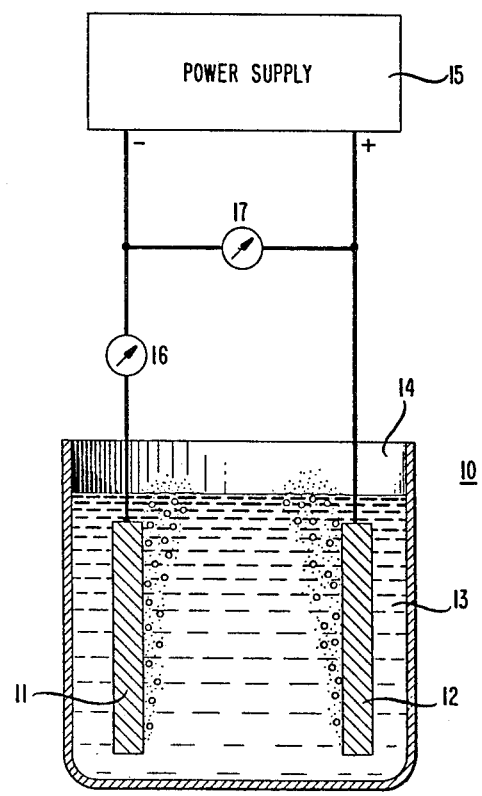

PALLADIUM ELECTROPLATING PROCEDURE

TECHNICAL FIELD

The invention involves a procedure for electroplating palladium. In particular, it involves replenishment of palladium in the electroplating procedure in which the compound used to replenish the bath is prepared in a special way.

BACKGROUND OF THE INVENTION

Precious metals are used as protective films on surfaces for a variety of reasons. In the jewelry trade, it is used to improve the appearance of an article as in gold plated jewelry. In other applications, it is used to protect against corrosion of metals and other surface materials. In the electrical arts protective films made of precious metals are used as conduction paths in electrical circuits and as contact surfaces in devices with electrical contacts. Gold is used extensively in these applications with great success. However, the increased price of gold makes it attractive to look at other precious metals as protective films on various surfaces.

Palladium and palladium alloys are used extensively in a variety of industrial applications. Typical examples are the jewelry trade where such films are used to protect surfaces against corrosion and to improve appearance, in the electrical arts in various electrical devices and electronic circuits and in the optical field for various types of optical devices.

Because of chemical inertness and reasonable hardness, palladium is especially attractive as an electrical contact material in electrical connectors, relay contacts, switches, etc. Various palladium alloys such as palladium-silver, palladium-nickel and palladium-copper are also useful for the same applications. Indeed, because of the increasing cost of gold, palladium and palladium alloys become more and more attractive economically as a contact material, surface material, and in other applications where gold is traditionally used.

A particularly difficult problem in the commercial electroplating of palladium, especially at high plating rates, is accumulation of ions in solution from replenishment of palladium in the bath and maintenance of hydroxide concentration of the bath. Actually, in most situations, these problems are related in that a base (i.e., KOH) is often added to the bath to neutralize hydrogen ions liberated in the electroplating process. The addition of base leads to the accumulation of cations (potassium in the case of KOH). Also, the replenishment of palladium leads to accumulation of anions (i.e., chlorine ions where palladium chloride is used to replenish the bath). Such accumulation limits the lifetime of the bath, usually because an important ingredient precipitates out of the electroplating bath (typically the buffer such as, $K_2HPO_4$). Further, accumulation of ions varies the chemical and physical properties of the bath as a function of time. Such a change might vary the properties of the electroplated palladium as a function of time or vary the amount of palladium metal electroplated per unit of electricity.

Most important from a commercial point of view, it limits the lifetime of the electroplating bath, necessitating more frequent bath changes. This is both troublesome, requiring interruptions in the plating process, and leads to waste of valuable chemicals. In addition, uncertainty and variation in the amount of palladium electroplated per unit of plating current requires that excessive palladium metal be electroplated to ensure a minimum required thickness. Such a procedure is wasteful of palladium metal.

It is highly desirable to use a replenishment scheme which neutralizes accumulated acid produced in the electroplating process and does not lead to accumulation of anions. Such a compound is palladium oxide (or the hydrated form $Pd(OH)_2$) but this compound has limited solubility in the palladium electroplating bath and dissolves only very slowly. It is highly desirable to have a preparation procedure for palladium hydroxide in which the palladium hydroxide remains or is formed in a state that is highly and rapidly soluble in the palladium electroplating bath. In addition, palladium recovered from scrap such as electrical contact surfaces is usually recovered in the form of $Pd(NH_3)_2Cl_2$ and a procedure for preparing palladium hydroxide from this compound is highly desirable.

SUMMARY OF THE INVENTION

The invention is a palladium electroplating procedure in which at least part of the palladium is introduced into the electroplating bath (usually to replenish palladium in the bath) in the form of palladium hydroxide prepared in a special way. This preparation procedure involves use of a strong oxidizing agent on an aqueous solution of $Pd(NH_3)_2Cl_2$. A typical strong oxidizing agent is an aqueous solution of sodium hypochlorite. Freshly prepared palladium hydroxide dissolves rapidly in palladium electroplating bath and this quality of high solubility is best preserved by maintaining the hydroxide under water or in the form of a slurry. Replenishment of palladium electroplating processes with palladium hydroxide maintains the pH of the bath by neutralizing hydrogen ions liberated in the electroplating process and avoids accumulation of anions in the electroplating bath.

BRIEF DESCRIPTION OF THE DRAWING

The FIGURE in the drawing shows a typical electroplating apparatus useful in the practice of the invention.

DETAILED DESCRIPTION

The invention is based on the observation that strong oxidation of $Pd(NH_3)_2Cl_2$ will decompose $NH_3$ and yield palladium hydroxide. A suitable strong oxidizing agent is hypochlorite ion or hypobromite ion with hypochlorite preferred because of cost and stability. Typically, an alkali-metal hypochlorite (e.g., sodium hypochlorite) is used although other procedures (e.g., chlorine gas) may be used to produce the hypochlorite ion. The reaction solution should be alkaline to ensure solubility of the palladium diammine dichloride and to ensure a source of hydroxyl ions for the oxidation reaction.

An understanding of the reaction is facilitated by writing down the chemical equation for the reaction:

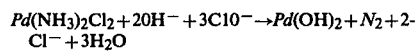

Certain conditions are preferred so as to promote rapid formation of the palladium hydroxide. Relatively high alkaline concentration (i.e., high pH) is preferred both to make the reaction rapid and to increase the rate of dissolution of palladium diammine dichloride. Best results are obtained in the pH range above 9 or even 11. Most preferred is the pH range from 13 to 14. Although the hydroxide ion may be introduced in a large variety of ways, generally the introduction of an alkali-metal hydroxide (e.g., NaOH, KOH, etc.) is most convenient.

In general terms, the palladium hydroxide is made as follows:
(a) The palladium diammine dichloride is added (generally as a solid) to an alkaline aqueous solution and the solution heated to above room temperature (generally 50–60 degrees C.).
(b) Excess hypochlorite ion (generally an aqueous solution of sodium hypochlorite) is added to the above solution.
(c) Excess hydrogen peroxide solution is added to remove the excess hypochlorite.
(d) The resulting precipitate is then separated and washed with water until chloride free.

A more specific procedure for making palladium hydroxide is as follows:
1. Dissolve 4.6 gms of sodium hydroxide in 300 ml of water and heat to 50–60 degrees C.
2. Add 10 gms of $Pd(NH_3)_2Cl_2$ gradually. Generally, the resulting solution is clear; if not, filter.
3. Add a slight excess of 4–6 percent aqueous solution of NaOCl (generally about 400 ml). The exact amount of the NaOCl solution to be added cannot be specified, because its strength varies with age. The presence of excess NaOCl can be assured if the addition of a small amount of NaOCl no longer causes gas ($N_2$) evolution. It can also be ascertained by observing the yellow to red coloration which occurs due to $I_2$ liberation when a small amount of the supernatant liquid is added into a dilute KI solution.
4. Add excess hydrogen peroxide (typically 50 ml of 3 percent aqueous $H_2O_2$).
5. Remove precipitate by filtering, decanting, etc.
6. Wash precipitate with water until chloride free.

The excess sodium hypochlorite added in step 3 above tends to redissolve palladium hydroxide because of its oxidation to $PdCl_6^{-2}$. This ion is evident by the red color in the supernatant liquid. The addition of hydrogen peroxide in step 4 reduces quadrivalent palladium species back to palladium hydroxide. Also, any excess hypochlorite ion remaining in solution is reduced to chloride ion. Freshly prepared palladium hydroxide dissolves quickly in the plating solution regardless of whether it remains wet or is air dried. The property of easy dissolution is important for its use in replenishing palladium in a palladium electroplating bath. Generally, use of heat (as, for example, in drying) is to be avoided since it increases the rate of formation of the insoluble form from the palladium hydroxide. It is believed that the structural change responsible for the formation of the insoluble form is the irreversible formation of $PdO.H_2O$ from $Pd(OH)_2$.

The palladium electroplating process involves passing current through anode, electroplating bath and cathode (surface being electroplated with palladium). An inert (nonconsumable) anode is usually used although a consumable anode could also be used. Generally, for efficient electroplating, the conductivity of the electroplating bath should be greater than $10^{-3}$ mho-cm. For most applications, it is preferred that the pH of the electroplating bath be greater than 7.

The invention may be practiced using a variety of palladium electroplating baths. Many of the baths are based on an ammoniacal medium and often the baths have various additions, such as ammonium phosphate, ammonium sulfate, ammonium formate, ammonium chloride, ammonium sulfate, ammonium carbonate, and other substances typically as conducting salts and to stabilize complexes in the solution.

Some typical palladium baths contain $Pd(NH_3)_2(NO_2)_2$ as a source of palladium and optionally $NH_4NO_3$ and optionally $NaNO_2$ as conducting salts and sources of ammonium ion, nitrate ion Typical pH for such solutions are usually between 8 and 10 with 9 preferred. The pH may be adjusted by addition of an alkaline agent such as $NH_4OH$. Typical composition is 4 g/l of palladium metal (added as $Pd(NH_3)_2(NO_3)_2$), 90 g/l $NH_4NO_3$, 11.3 g/l $NaNO_2$ and $NH_4OH$ to pH 9. Increased palladium concentration is often preferred where high plating rates are used. Bath temperatures above room temperature are often used in the plating process. A saturated solution of the palladium salt is often advantageous.

Baths based on $Pd(NH_3)_4(NO_3)_2$ are also useful with or without the addition of other salts to stabilize the complex and increase conductivity. The pH is typically between 7 and 10 and may be adjusted by use of an alkaline agent such as $NH_4OH$.

Various ammine chlorides are also useful for the plating solution. In particular, the palladium complex $Pd(NH_3)_2Cl_2$ is useful as a source of palladium where excess ammonia is added. The range from 32 g/l to saturation is most useful. Certain ammonium salts are sometimes added, particularly ammonium chloride typically in the range from 65 to 250 g/l. An alkaline agent (preferably aqueous $NH_3$) is added to adjust the pH to the range from 8.0 to 12 with 8.8 to 9.2 preferred. Bath temperature during electrodeposition may vary over large limits, but room temperature to 90 degrees C. is usually preferred.

Generally, for the described process, a high concentration of the palladium salt is preferred with or without the conducting salts, provided such a bath is stable.

Other palladium complexes are also useful as plating baths in the practice of the invention. The palladium complex $Pd(NH_3)_4Br_2$ is used as the basis for some palladium plating baths. Useful concentrations in terms of palladium metal are from 2 g/l to saturation (about 35 g/l). The pH range is from 9 to 10 with the range from 9 to 9.5 preferred. Other palladium complexes such as the corresponding sulfate, phosphate, tartrate, citrate, oxalate and carbonate also may be used.

The double nitrite salts of palladium are also useful for palladium plating. A typical salt is $K_2Pd(NO_2)_4.2H_2O$. Other similar salts (i.e., potassium replaced by another alkali metal such as sodium, lithium, etc.) may also be used.

Another typical palladium bath contains a palladium solution complexed with ethylene diamine or other complexing agent. Typically, in making the initial bath, the palladium is added as $PdCl_2$ and sulfate as an alkali-metal sulfate ($Na_2SO_4$). Sufficient complexing agent (i.e., ethylene diamine) is added to dissolve the palladium chloride. Typical concentrations are 28 g/l $PdCl_2$ and 140 g/l $Na_2SO$. Increased concentration of palladium compound is desirable up to the saturation concentration of the palladium complex. The pH may vary over certain limits (i.e., 10–13) but is usually between 11 and 12.

The simple salt $PdCl_2$ is also used in plating baths in the practice of the invention. Typically, the bath comprises $PdCl_2$, ammonium chloride and a strong acid (generally aqueous HCl) to a pH from 0.1 to 0.5. Typical concentration of PdCl$_2$ is 52 g/l to saturation and 22–38 g/l NH$_4$Cl. Plating temperature may vary over large limits but room temperature to 50 degrees C. is usually used.

Another useful palladium electroplating bath contains Pd(NH$_3$)$_4$Cl$_2$ as the source of palladium. Amounts of at least 10 g/l (in terms of palladium metal) are preferred with various salts such as NH$_4$Cl added as conducting salts. Sufficient aqueous ammonia is added to yield a pH between 9 and 10, preferably 9.4. Higher concentrations of Pd(NH$_3$)$_4$Cl$_2$ are more preferred, say greater than 20 g/l or even 100 g/l. Increased concentration of the palladium complex reduces the amount of conducting salts (i.e., NH$_4$Cl) that can be dissolved in the bath.

Preparation of the plating baths may be accomplished in a variety of ways, including direct addition of the palladium salt (e.g., Pd(NH$_3$)$_4$Cl$_2$) or addition of substances that yield the palladium species on chemical reaction. For example, the palladium complex Pd(NH$_3$)$_4$Cl$_2$ may be obtained by the addition of PdCl$_2$ to boiling ammonia water. Plating solutions and palladium plating are discussed in a book by E. M. Wise entitled *Palladium; Recovery, Properties and Uses*, Academic Press, New York, 1968, especially chapter 6.

Although a variety of palladium electroplating baths may be used as described above, the most preferred baths comprise one or more organic aliphatic polyamines as complexing agents for the palladium. The preferred aliphatic polyamine should have from 3 to 20 carbon atoms. Complexing agents with less than 3 carbon atoms yield useful results but tend to evaporate and limit the lifetime of the bath. Complexing agents with more than 20 carbon atoms usually have limited solubility in aqueous solutions. More preferred of the complexing agents are the compounds diaminopropane and diethylenetriamine with 1,3-diaminopropane most preferred. Baths containing these complexing agents yield excellent palladium films, especially at high plating current densities (above 50 ASF). In addition, the conditions (pH, temperature, etc.) under which optimum plating occurs with these preferred complexing agents permit rapid plating without incorporation or evolution of hydrogen. Also, undesirable chemical attack on the surface being plated is minimal or insignificant under optimum conditions of plating with these complexing agents.

Within the limitations set forth above, the structure of the complexing agent may vary considerably. In particular, these complexing agents may contain certain substituents which do not significantly alter their complexing properties but may increase solubility, stability, electrochemical reduction (or oxidation) potential, etc. Typical substituents are hydroxyl groups, chloride and bromide. The complexing agents should be stable to the conditions of the electroplating process and, in particular, not undergo oxidation or reduction under the conditions of the electroplating process. For example, carboxylic acid groups should generally be avoided because such substituted aliphatic polyamines are generally not electrochemically stable. Also, the reduction potential is more noble such that their electrochemical reduction occurs along with hydrogen.

Often the choice of a particular polyamine complexing agent depends on electrochemical stability. It is often advantageous to have a reduction potential far removed from the reduction potential of water so that even at high plating rates, hydrogen is not liberated as palladium is electroplated.

Alloy plating may also be carried out using the polyamine complexing agent. Typical elements alloyed with palladium are silver, copper, nickel, cobalt, iron, gold, chromium, manganese, ruthenium, rhodium, platinum and iridium. Particularly useful are copper, nickel and silver. Preferred are alloys comprising at least 10 mole percent palladium, remainder copper, silver and/or nickel. Other useful alloys are 60 mole percent palladium, remainder silver, copper and/or nickel, 40 mole percent palladium, remainder silver, copper and/or nickel, etc. The palladium-silver alloys are particularly useful, especially for electrical contact surfaces. Often such contact surfaces have thin layers of gold on top to increase reliability and increase lifetime.

A large variety of counter ions (anions) may be used in the electroplating bath (generally introduced in the initial formulation) provided the anions are stable (chemically and electrochemically) and in particular are not subject to oxidation or reduction under conditions of the electroplating process. In addition, the anion should not interfere with the plating process by either chemical attack on the surface being plated or on the metal complex system. Typical anions are halides, nitrate, sulfate and phosphates. Chloride ion is preferred because of the stability of the chloride ion under conditions of the electroplating process. Also, certain ions, including those set forth above, may be used as supporting electrolyte to increase conductivity of the electroplating bath. The cation used for the supporting electrolyte may be any soluble ion which does not interfere with the electroplating process. Alkali-metal ions (Na, K, Li) are particularly preferred because of solubility and stability.

Palladium electroplating baths comprising organic aliphatic polyamines as complexing agents offer a number of advantages over conventional palladium baths. The electroplating process employing such a bath can be carried out at quite high pH concentrations so as to avoid surface corrosion during the plating process. This is particularly important when plating copper and copper alloys often used in electrical connectors and contact surfaces. Also, the plating process operates at an electropotential well removed from the hydrogen gas evolution potential. For this reason, hydrogen gas evolution is avoided even under rapid high current plating conditions. Thus, high plating rates can be used without the danger of hydrogen gas evolution which is deleterious to the metallic properties of palladium metal. In addition, experiments carried out with this type of plating bath yield excellent results in terms of efficiency and metallurgical characteristics of the plated palladium, even at high plating rates such as 200 or even 500 amperes per square foot.

The pH of the palladium electroplating bath may vary over large limits but generally an alkaline solution is preferred. Typically, pH is from 7.5 to 13.5 with the range from 11 to 12.5 preferred. The preference applies particularly to the preferred polyamine complexing agents, namely 1,2-diaminopropane, 1,3-diaminopropane and diethylenetriamine.

The plating process may be carried out with or without a buffer system. A buffer system is often preferred because it stabilizes the pH on the bath and adds to the electrical conductivity of the bath. Typical buffer systems are the phosphate system, borate system, bicarbonate system, etc. Preferred is the HPO$_4^{-2}$/PO$_4^{-3}$ system often made by adding an alkali metal hydroxide (KOH, NaOH, etc.) to an aqueous solution of the hydrogen phosphate ion. Generally, the concentration of buffer varies from 0.1 molar to 2 molar with 1.0±0.2 molar preferred. The mole ratio of hydrogen phosphate to phosphate ion varies from 5/1 to 1/5 with equal mole amounts within ±50 percent preferred. These mole ratios often depend on the particular pH desired in the plating bath. The bath temperature may vary over large limits including from room temperature to 80 degrees C. The temperature range from 40 to 60 degrees C. is most preferred because plating rates are high without excessive energy being required.

Various surfaces may be plated using the disclosed process. Usually, the plating would be carried out on a metal surface or alloy surface, but any conducting surface would appear sufficient. Also, electrolessly plated surfaces may be useful. Typical metal and alloy surfaces are copper, nickel, gold, platinum, palladium (as, for example, a surface electrolessly plated with palladium and then electroplated with palladium in accordance with the invention). Various alloy surfaces may also be used such as copper-nickel-tin alloys.

The composition of the bath may vary over large limits provided it contains a source of palladium and significant amounts of one or more polyamines of the class set forth above. In general, sufficient polyamine should be present to complex with the palladium. Usually, it is advantageous if excess polyamine is present in the bath solution.

The palladium concentration in the bath typically varies from 0.01 molar to saturation. Preferred concentrations often depend on plating rate, cell geometry, agitation, etc. Typical preferred palladium concentration ranges for high-speed plating (50 to 1000 ASF) are higher than for low-speed plating (up to 50 ASF). Preferred palladium concentration ranges for high-speed plating vary from 0.1 to 1.0 molar. For low-speed plating, the preferred range is from 0.05 to 0.2 molar. Where palladium alloy plating is included, the alloy metal (usually copper, silver or nickel) replaces part of the palladium in the composition of the plating bath. Up to 90 mole percent of palladium may be replaced by alloy metal.

The amount of complexing agent (polyamine) may vary over large limits, typically from 0.5 times (on the basis of moles) the concentration of the palladium species to saturation of the complexing agent. Generally, it is preferred to have excess complexing agent, typically from 2 times to 12 times the mole concentration of the palladium species. Most preferred is about 6 times the mole concentration of palladium. The preferred ranges of complexing agent in terms of palladium species are the same for high-speed and low-speed baths.

The concentration of buffer may vary over large limits. Such concentrations often depend on cell design, plating rates, etc. Typically, the buffer concentration varies from 0.1 molar to saturation with from 0.2 to 2.0 molar preferred.

The bath may be prepared in a variety of ways well known in the art. A typical preparation procedure which yields excellent results is set forth below: Equal volumes (142 mls) of 1,3-diaminopropane and water are mixed in a beaker. Heat of solution is sufficient to heat the resulting solution to about 60 degrees C. To this solution with vigorous stirring are added 50 gms of $PdCl_2$ in portions of 0.5 gms every 2 minutes. Since the resulting reaction is exothermic, the solution can be maintained at 60 degrees C. by adjusting the rate of addition of $PdCl_2$. The solution is filtered to remove solid matter (generally undissolved $PdCl_2$ or PdO) and diluted to one liter.

To this solution are added 127 gms of $K_3PO_4$ and 70 gms of $K_2HPO_4$. The pH is 12.3 at 25 degrees C. and can be adjusted upward by the addition of KOH and downward by the addition of $H_3PO_4$.

A variety of plating apparatus can be used in the practice of the invention. Particularly useful is strip line plating apparatus of the type described in U.S. Pat. No. 4,153,523 issued to D. E. Koontz and D. R. Turner on May 8, 1978 and U.S. Pat. No. 4,230,538 issued to D. R. Turner on Oct. 28, 1980. These types of plating apparatus are particularly useful for plating contact surfaces for connectors, switches, etc., and generally employ high plating rates under well-controlled temperatures. In addition, the palladium hydroxide is often conveniently added in a reservoir tank attached to the plating cell.

The FIGURE shows apparatus 10 useful in the practice of the invention. The surface to be plated 11 is made the cathode in the electrolytic process. The anode 12 is conveniently made of platinized titanium or may be made of various other materials such as oxides of platinum group metals, binder metal oxides, etc. Both anode and cathode are partially immersed in the electroplating bath 13 containing source of palladium complex with an organic aliphatic polyamine. A container is used to hold the palladium plating solution and the anode 12 and cathode 11 are electrically connected to source of electrical energy 15. An ammeter 16 and voltmeter 17 are used to monitor current and voltage. The voltage and current are controlled inside the source of electrical energy 15. The electroplating bath is conveniently replenished by the addition of palladium hydroxide made in accordance with the invention.

What is claimed is:

1. A process for electroplating a metallic substance on a surface, said metallic substance comprising palladium, comprising the step of passing current through a cathode, an electroplating bath and an anode with cathode potential great enough to electroplate palladium and said electrochemical bath having a conductivity greater than $10^{-3}$ mho-cm characterized in that the electroplating bath is replenished by the addition of palladium hydroxide made by the oxidation of palladium diammine dichloride by hypochlorite ion in an alkaline aqueous solution.

2. The process of claim 1 in which the pH of the electroplating bath is greater than 7.

3. The process of claim 1 in which the source of the hypochlorite ion is an alkali-metal hypochlorite.

4. The process of claim 3 in which the alkali-metal hypochlorite is sodium hypochlorite.

5. The process of claim 1 in which the source of hypochlorite ion is chlorine gas bubbled through an aqueous solution.

6. The process of claim 1 in which the alkaline aqueous solution has a pH greater than 9.

7. The process of claim 6 in which the pH of the aqueous solution is greater than 11.

8. The process of claim 7 in which the pH of the aqueous solution is between 13 and 14.

9. The process of claim 1 in which the oxidation of palladium diammine dichloride is carried out by a procedure comprising the steps of:

(a) adding palladium diammine dichloride to an alkaline aqueous solution;
(b) adding excess hypochlorite ion in aqueous solution;
(c) adding excess hydrogen peroxide solution; and
(d) separating the resulting precipitate.

10. The process of claim 1 in which the palladium hydroxide is kept wet and at room temperature between formation and addition to the electroplating bath.

11. The process of claim 1 in which the electroplating bath comprises palladium in the form of a complex with at least one organic aliphatic polyamine with 3 to 20 carbon atoms.

12. The process of claim 11 in which the organic aliphatic polyamines are compounds selected from the group consisting of diaminopropane and diethylenetriamine.

13. The process of claim 12 in which the organic aliphatic polyamine is 1,3-diaminopropane.

14. The process of claim 12 in which the pH of the electroplating bath is between 7.5 and 13.5.

15. The process of claim 14 in which the pH of the electroplating bath is between 11 and 12.5.

16. The process of claim 1 in which the electroplating bath comprises a buffer.

17. The process of claim 16 in which the buffer is the hydrogen phosphate-phosphate system with concentration of buffer between 0.1 and 2 molar.

18. The process of claim 1 in which the electroplating bath temperature during electroplating is between 40 and 60 degrees C.

* * * * *